United States Patent
Miyashita et al.

(10) Patent No.: US 7,751,684 B2
(45) Date of Patent: Jul. 6, 2010

(54) SIGNAL PROCESSOR

(75) Inventors: Masahiko Miyashita, Tokorozawa (JP);
Takao Yamada, Tokorozawa (JP);
Nobuo Ohyama, Tokorozawa (JP); Kou Atsumi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1681 days.

(21) Appl. No.: 10/950,559

(22) Filed: Sep. 28, 2004

(65) Prior Publication Data
US 2005/0069286 A1 Mar. 31, 2005

(30) Foreign Application Priority Data
Sep. 29, 2003 (JP) ............................... 2003-336974

(51) Int. Cl.
*H04N 5/93* (2006.01)
(52) U.S. Cl. ........................................................ 386/52
(58) Field of Classification Search .................. 386/52, 386/69, 55, 64, 95
See application file for complete search history.

(56) References Cited

U.S. PATENT DOCUMENTS

| | | | | |
|---|---|---|---|---|
| 5,237,648 | A | 8/1993 | Mills et al. | 395/133 |
| 5,760,767 | A * | 6/1998 | Shore et al. | 715/723 |
| 6,658,196 | B2 * | 12/2003 | Sakai et al. | 386/55 |
| 2002/0018146 | A1 | 2/2002 | Matsubayashi | 348/700 |
| 2002/0097255 | A1 | 7/2002 | Toyoda et al. | 345/719 |
| 2002/0164152 | A1 | 11/2002 | Kato et al. | 386/95 |

FOREIGN PATENT DOCUMENTS

| | | |
|---|---|---|
| EP | 0764951 A1 | 3/1997 |
| EP | 0973162 A2 | 1/2000 |
| EP | 1229544 A2 | 8/2002 |
| EP | 1394791 A2 | 3/2004 |
| JP | 03-055985 | 3/1991 |
| JP | 2003-132634 | 5/2003 |

OTHER PUBLICATIONS

DJ-Resource: Topics: Pioneer CDJ-1000, XP-002316487; pp. 1-4.
Pioneer Compact Disc Player, CDJ-1000, Operating Instructions; pp. 1-20.

* cited by examiner

*Primary Examiner*—Thai Tran
*Assistant Examiner*—Tat Chio
(74) *Attorney, Agent, or Firm*—Drinker Biddle & Reath LLP

(57) ABSTRACT

A signal processor includes a buffer memory for storing the image signal for output as a main image signal; a point setting section for storing a position on a temporal axis of the main image signal as a registration point in response to a given capture command, the main image signal corresponding to the capture command; a playback control section for causing the buffer memory to output an image frame following the registration point in response to a given playback command; a video capture section for generating a registration image based on at least one image frame in a neighborhood of the registration point of the main image signal outputted from the buffer memory, and storing the registration image; and an image superimposing section for superimposing the registration image onto the main image signal for display in a signal screen to generate a composite image signal.

13 Claims, 16 Drawing Sheets

MAIN SCREEN

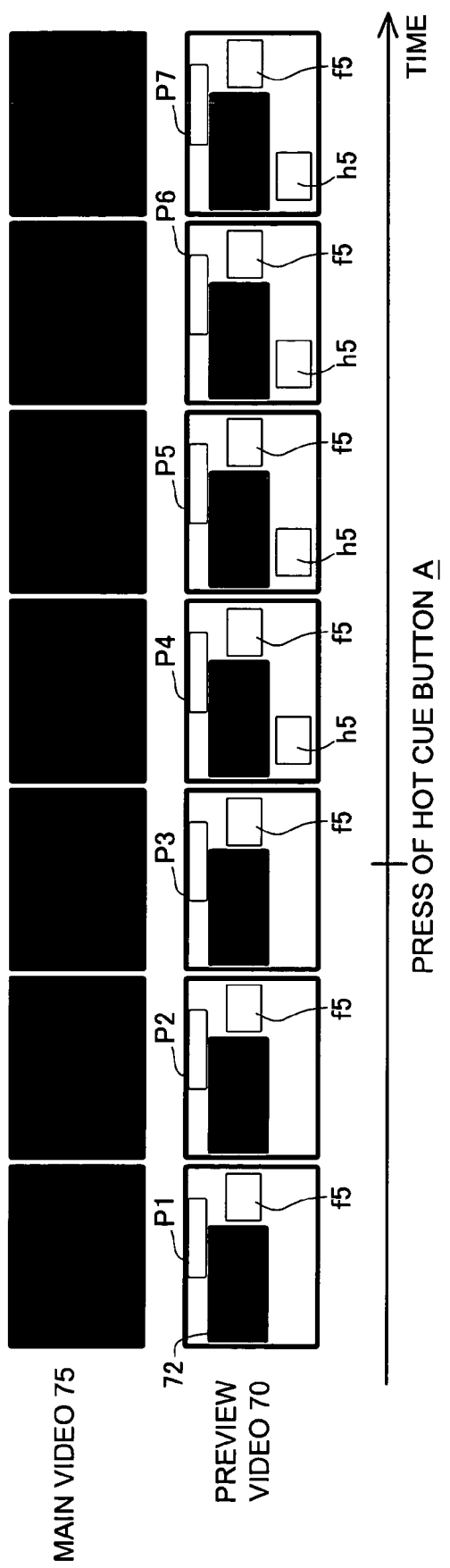

SIGNAL PROCESSOR

BACKGROUND OF THE INVENTION

1. Field of the Invention

The present invention relates to a signal processor for processing signals read from an information recording medium such as a CD (Compact Disk), DVD (Digital Versatile Disk), and MD (Mini Disk).

2. Description of the Related Art

There has been developed a digital playback system capable of audio effects control in real time through tempo (BPM: Beats Per Minute) change applied to playback audio of audio data read from an information recording medium such as a CD. Such a digital playback system allows users' real-time processing applied to playback audio through operation of dials and buttons, e.g., tempo acceleration, tempo deceleration, playback pause, and backward playback. With such processing, audio effects can be originally improvised by the user. Conventionally, with an analog record player, tempo change of playback audio has been done by varying the movement speed of a phonograph needle that traces grooves formed on an analog record for audio recording. During playback of the analog record, the user forcibly rotates a turntable carrying thereon the analog record with a speed different from a normal rotation speed. Such tempo change conventionally done by the analog record player is now done with the above-described digital playback system using CDs and DVDs recording digital information.

The conventional technology relevant to the above digital playback system is found in Patent Document 1 (Japanese Patent Kokai No. 2003-132634), for example.

While, in recent years, optical disks storing video information such as movies have been commonly on the market, no system is yet available for exercising real-time control over video effects during video playback from such optical disks.

The digital playback system found in Patent Document 1 and others can store a plurality of playback positions for audio data recorded on CDs and others. Such stored playback positions are called with any desired timing for audio playback therefrom to produce any desired audio effects. The issue is that, since these playback positions are numerically expressed by playback time and others, such a numerical expression is hardly associated with actual playback audio. Thus, to check the audio in the neighborhood of the playback positions, user needs to play back and listen to the audio from the playback position. Additionally, when many playback positions are stored, user is likely to choose the wrong playback position.

SUMMARY OF THE INVENTION

In view of the foregoing, it is an object of the present invention to provide a signal processor capable of controlling playback effects of video and audio read from recording media. It is a further object of this invention to provide a signal processor capable of controlling audio effects of audio data read out from recording media and easily associating a playback position with the audio.

According to a first aspect of the invention, there is provided a signal processor for displaying image signals including a plurality of image frames. The signal processor includes: a buffer memory for storing the image signal for output as a main image signal; a point setting section for storing a position on a temporal axis of the main image signal as a registration point in response to a given capture command, the main image signal corresponding to the capture command; a playback control section for causing the buffer memory to output an image frame following the registration point in response to a given playback command; a video capture section for generating a registration image based on at least one image frame in a neighborhood of the registration point of the main image signal outputted from the buffer memory, and storing the registration image; and an image superimposing section for superimposing the registration image onto the main image signal for display in a signal screen to generate a composite image signal.

According to a second aspect of the invention, a signal processor for playing back video is provided. The signal processor includes: an operation section including a rotary control panel; a playback control section for controlling, in real time, a-playback speed of the video in accordance with rotation of the control panel; and a video capture section for capturing, in response to a capture command coming from outside, at least one image frame of the video during playback, and generating a registration image based on the captured image frame to store the registration image. The playback control section displays the registration image on a display device while playing back the video.

Further features of the invention, its nature and various advantages will be more apparent from the accompanying drawings and the following detailed description of the preferred embodiments.

BRIEF DESCRIPTION OF THE DRAWINGS

FIG. 17 is a schematic diagram illustrating exemplary video as a result of the registration point copying process.

DETAILED DESCRIPTION OF THE INVENTION

Exemplary embodiments of the present invention will now be described.

Structure of Optical Disk Playback System

Figure 1:
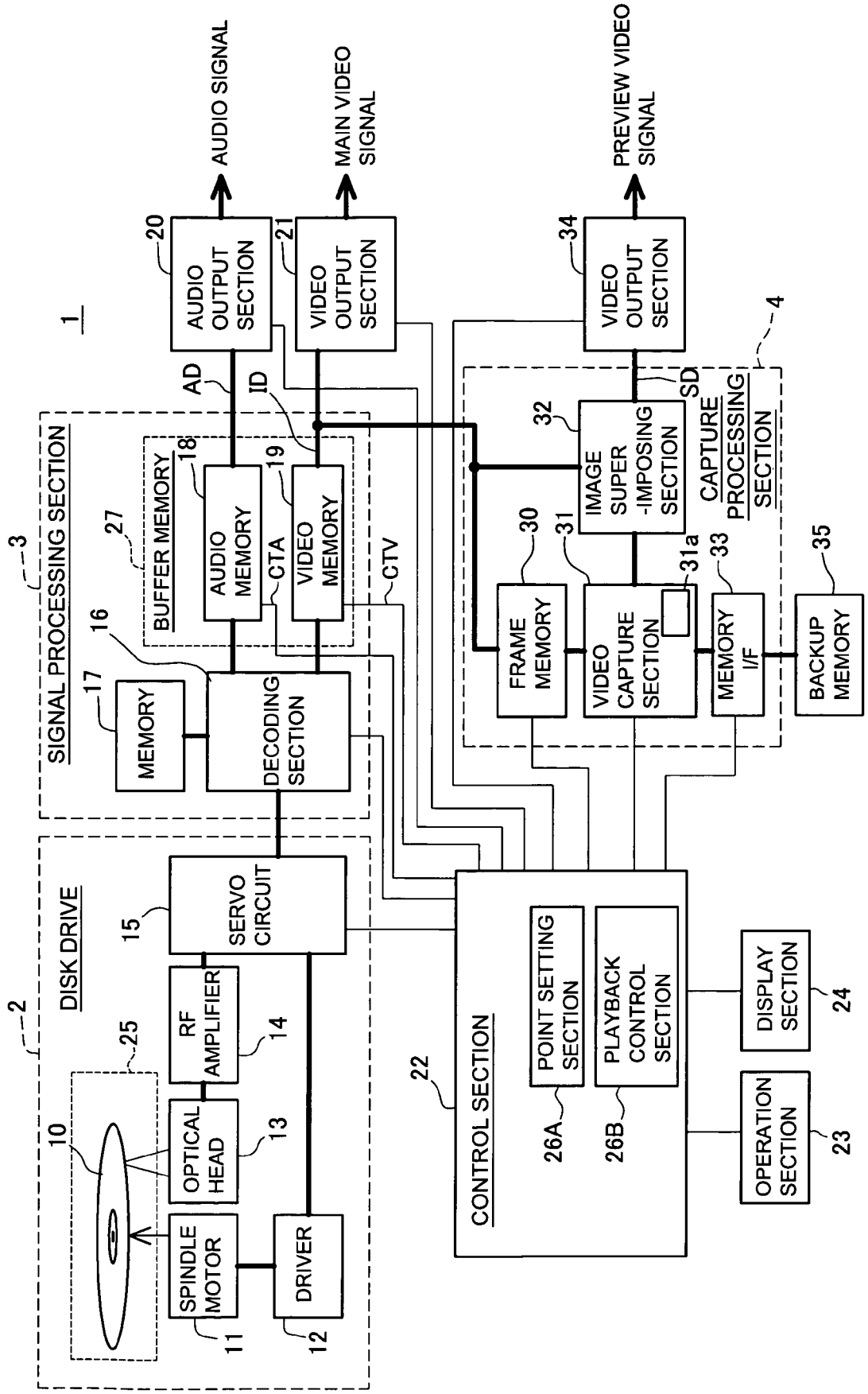
FIG. 1 is a schematic block diagram illustrating an optical disk playback system which is an example of the present invention.
Figure 2:
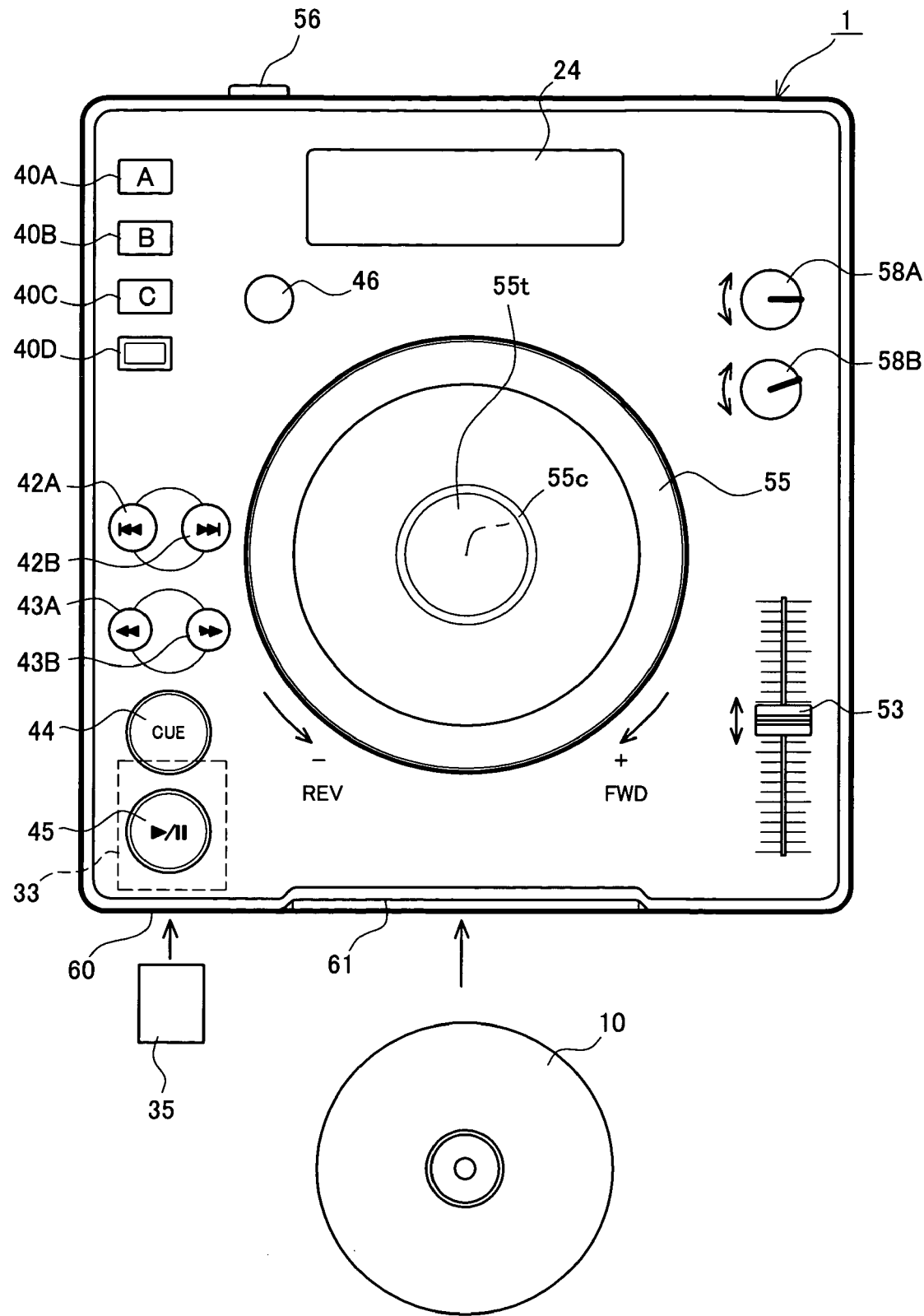
FIG. 2 is a schematic front view illustrating an outer appearance of the optical disk playback system of the example.
Figure 3:
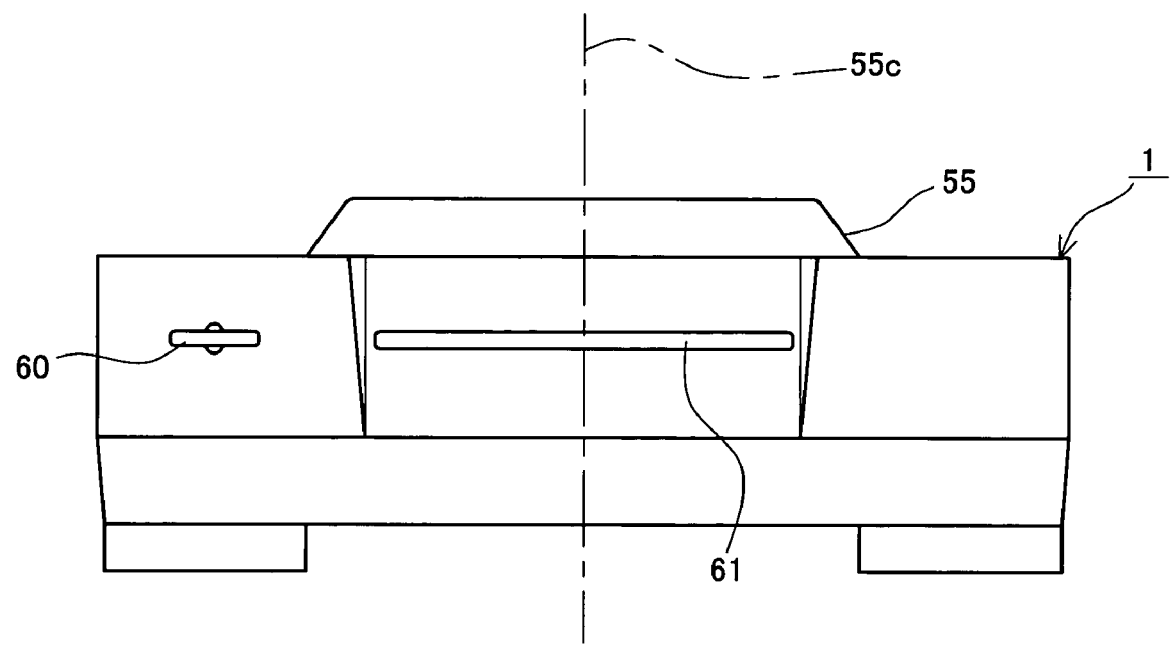
FIG. 3 is a bottom view of the optical disk playback system of FIG. 2.

FIG. 1 is a schematic block diagram illustrating an optical disk playback system 1 of the example, FIG. 2 is a schematic front view illustrating an outer appearance of this optical disk playback system 1, and FIG. 3 is a bottom view of the optical disk playback system 1 of FIG. 2. As shown in FIG. 1, the optical disk playback system 1 includes: a disk drive (recording medium drive section) 2; a signal processing section 3; a capture processing section 4; a control section 22; an operation section 23; a display section 24; an audio output section 20; a first video output section 21; and a second video output section 34. The control section 22 is connected to the processing components 2, 3, 4, 20, 21, 23, 24, and 34 over a bus (not shown) for transmission of control signals and data signals.

The control section 22 includes: a CPU (Central Processing Unit), ROM (ReadOnlyMemory), RAM (RandomAccessMemory) storing various control programs, and an input/output interface. The control section 22 includes a point setting section 26A and a playback control section 26B, which will be described later. Those sections 26A and 26B maybe implemented in a control program to be executed by the CPU. While those sections 26A and 26B are implemented in computer programs in this example, hardware may be an alternative option instead of the computer programs.

The operation section 23 issues a command to the control section 22 in response to any external operation made by a user who uses the optical disk playback system 1. In accordance with the command provided by the operation section 23, the control section 22 generates various types of control signals for supply to the processing components 2, 3, 4, 20, 21, and 34. FIG. 2 is a front view illustrating the front panel of the operation section 23. This front panel includes various input buttons 40A, 40B, and others, and a jog dial (control panel) 55 rotatable about a center axis 55c, those of which will be described later.

The disk drive 2 includes a loading mechanism 25 used for loading in a detachable manner an optical disk 10 such as a CD or DVD. The disk drive 2 further includes a spindle motor 11, an optical head 13, an RF amplifier 14, a driver 12, and a servo circuit 15. The optical disk 10 stores signals obtained by multiplexing an image signal and the corresponding audio signal, compressing and decoding the multiplexed signal based on MPEG (Moving Picture Experts Group) format or others, and then encoding the compressed and decoded signal based on the physical format of the optical disk 10. For information reading from the optical disk 10, the spindle motor 11 spins the optical disk 10 using a drive power received from the driver 12. The driver 12 is under the control of the servo circuit 15. At the time of information reading, the optical head 13 exposes the recording layer of the optical disk 10 to a light beam and detects light reflected on the surface of the recording layer. The optical head 13 then forwards the resulting detection signal to the RF amplifier 14. The RF amplifier 14 amplifies the detection signal provided by the optical head 13, and provides the amplified signal to the servo circuit 15. From the amplified signal provided by the RF amplifier 14, the servo circuit 15 generates a playback signal (RF signal; Radio-Frequency signal) for output to the signal processing section 3. The servo circuit 15 also executes a servo process of generating a tracking error signal and a focus error signal from the amplified signal, and forwards the result to the optical head 13.

The signal processing section 3 includes a decoding section 16, memory 17, and buffer memory 27. The decoding section 16 performs A/D conversion of an analog signal coming from the disk drive 2, and decodes the resulting digital signal using the memory 17 such as a RAM. The digital signal is separated into image data and audio data which are outputted to the buffer memory 27. The buffer memory 27 is structured by an audio memory 18 for temporarily storing the audio data, and a video memory 19 for temporarily storing the image data. As an exemplary structure, the buffer memory 27 may include a two-port memory for image data storage, and a two-port memory for audio data storage. The audio memory 18 and the video memory 19 each latch incoming data with predetermined timing in response to input/output control signals CTA and CTV provided by the control section 22, and read out addressed storage data for output. The buffer memory 27 outputs an audio signal AD to the audio output section 20, and outputs a main image signal ID to the video output section 21 and the capture processing section 4 in synchronization with the audio signal. In this example, the control section 22 establishes synchronization between the audio signal and the image signal for output from the buffer memory 27. In an alternative manner, the control section 22 may exercise control over these signals to be asynchronous for output from the buffer memory 27.

The audio output section 20 executes a filtering process and a modulation process on the audio signal AD received from the buffer memory 27, and forwards the result to an externally-located audio playback device (not shown). The video output section 21 executes various types of processes, i.e., color tone process, filtering process, noise elimination process and modulation process on the main image signal ID received from the buffer memory 27. As a result, a main video signal is generated, and sent to an externally-provided display device (not shown). Note here that the control section 22 controls operations of the audio output section 20 and the video output section 21 individually.

The main image signal ID outputted from the video memory 19 is transferred to the capture processing section 4 which captures the main image signal ID in response to a command coming from the control section 22. From the captured main image signal ID, a registration image (sub image) is generated and stored.

To be specific, the capture processing section 4 is structured by a frame memory 30, a video capture section 31, an image superimposing section 32, and a memory interface 33. The frame memory 30 buffers the main image signal ID coming from the video memory 19 with predetermined timing in response to control signals and timing signals coming from the control section 22. The frame memory 30 further produces an image frame from the main image signal ID and stores the image frame. The frame memory 30 outputs an image frame stored therein to the video capture section 31 with predetermined timing. The video capture section 31 captures the image frame provided by the frame memory 30 in response to the control signals and the timing signals coming from the control section 22. The captured image frame is reduced in resolution, and the resulting registration image is stored in image memory 31a. Note that, through control by the control section 22, the registration frame to be stored in the image memory 31a can be recorded onto backup memory 35 over the memory interface 33. Conversely, the registration image stored in the backup memory 35 can be read out for storage into the image memory 31a.

Out of the registration images stored in the image memory 31a, the video capture section 31 reads a registration image designated by a command from the control section 22 for supply to the image superimposing section 32. The image superimposing section 32 superimposes the registration image provided by the video capture section 31 onto the main image signal ID provided by the video memory 19. Then, for the purpose of overlay-displaying text information and others, an OSD (On Screen Display) process is executed to generate a composite image signal SD for supply to the video output section 34. On the composite image signal SD received from the image superimposing section 32, the video output section 34 executes various types of processes, i.e., color tone process, filtering process, noise elimination process, and modulation process. The resulting preview video signal is provided to the externally-provided display device (not shown).

Figure 4:
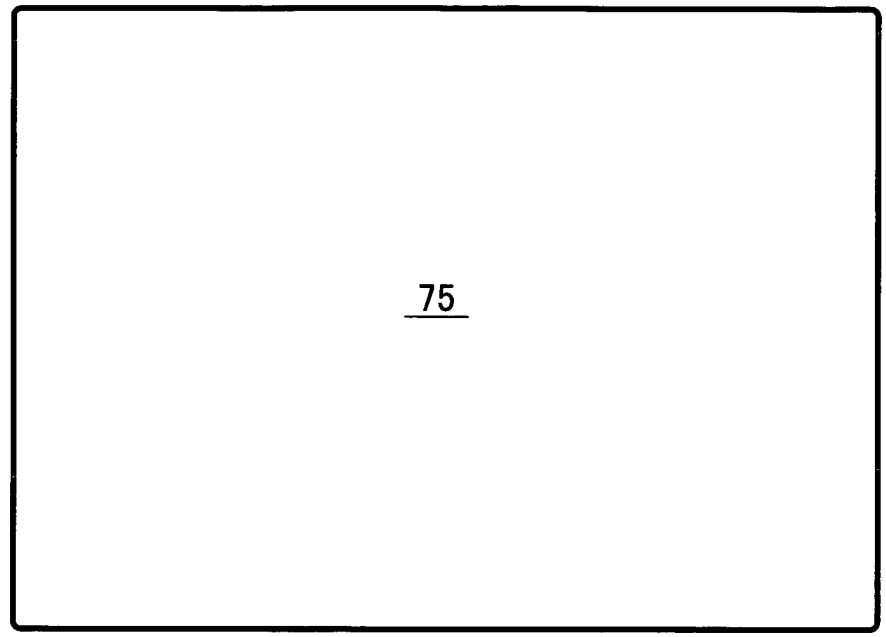
FIG. 4 is a schematic diagram illustrating main video produced from a main video signal.
Figure 5:
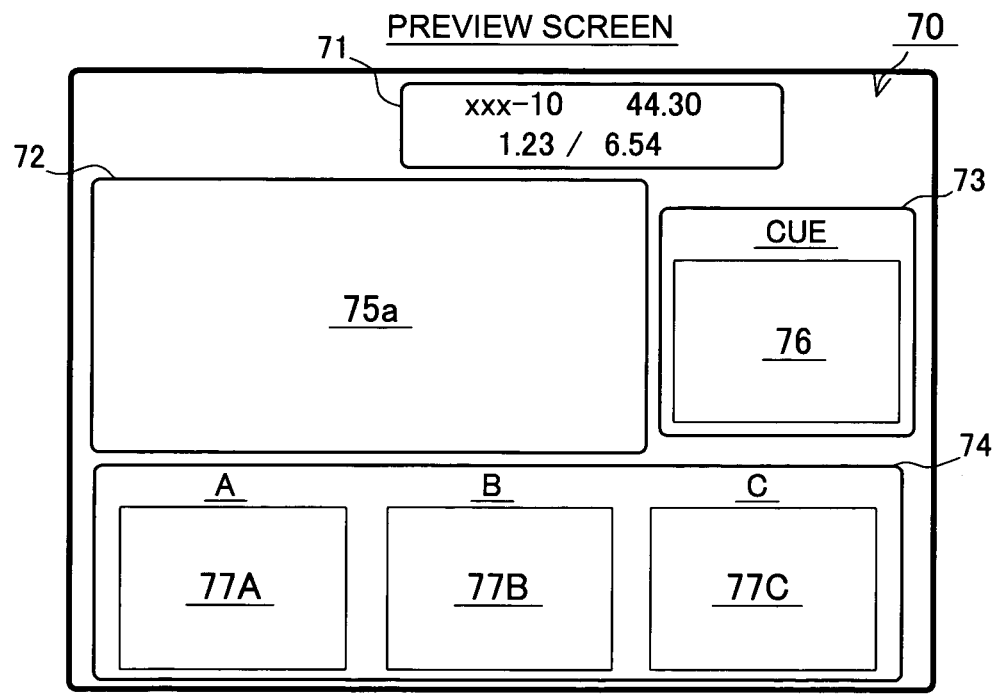
FIG. 5 is a schematic diagram illustrating preview video produced from a preview video signal.

FIG. 4 is a diagram illustrating video (main video) 75 produced from the main video signal, and FIG. 5 is a schematic diagram illustrating exemplary video (preview video) 70 produced from the preview video signal. The main video 75 of FIG. 4 can be displayed on a display device with a large screen for a large number of viewers, or recorded onto recording media by using recording device, for example.

The preview video 70 of FIG. 5 maybe displayed on a display device that accommodates a rather small-sized image enough for the user of the optical disk playback system 1 to view. The preview video 70 includes a main display window 72, a cue display window 73, a hot cue display window 74, and a playback information display window 71. The main display window 72 displays a main video 75a having the same contents as the main video 75 of FIG. 4 but smaller in image size (resolution). The cue display window 73 displays a registration image (cue image) 76, and the hot cue display window 74 displays three registration images (hot cue images) 77A, 77B, and 77C of thumbnail size. In the present example, the main video 75a is displayed within the confines of the main display window 72. Alternatively, the main video 75a may be displayed entirely over the preview video 70 as background. In the playback information display window 71, displayed are recording information of the optical disk 10, information indicating in what state the currently played back main video 75 is, and the like. For example, the playback information display window 71 displays such information as file name and file number of playback video and playback audio, tune name of the playback audio, playback time, and recording time. In the example of FIG. 5, the display contents "xxx-10 44.30" indicate the name "xxx" of the optical disk 10, the file number "10" of the current playback video and audio, and the total recording time "44.30" minutes of information recorded on the optical disk 10. Another display contents "1.23/6.54" indicate the recording time "6.54" minutes of the current playback video and audio, and the playback time "1.23" minutes as of the point in time. These contents in the playback information display window 71 are to be displayed also in the display section 24 provided to the front panel of FIG. 2.

Referring to FIG. 2, responding to a user's action by pressing a power switch 56 of the optical disk playback system 1, the control section 22 detects the press of the power switch 56. Thereafter, the control section 22 reads an initial program from internally-provided ROM (not shown) for execution so that the optical disk playback system 1 is activated. After the user inserts the optical disk 10 into a disk insertion port 61 of FIGS. 2 and 3, the loading mechanism 25 responsively guides thus inserted optical disk 10 to inside so that the optical disk 10 is loaded at a predetermined position. The user can also load the portable backup memory 35 in a detachable manner through insertion into a memory insertion port 60 of FIGS. 2 and 3. Herein, through the press of an eject button (not shown), the loaded optical disk 10 and the backup memory 35 can be ejected from the optical disk playback system 1.

In the below, the operation of the optical playback system 1 of the above structure is described in detail.

Basic Operation

With the loading mechanism 25 loading the optical disk 10, when the user presses a playback button 45, the control section 22 responsively detects the press of the playback button 45. Then, recording data is read from the optical disk 10 so that playback of video and audio is started. At this time, the playback control section 26B (see FIG. 1) provides the control signals CTV and CTA to both the video memory 19 and the audio memory 18 to output the main image signal ID and the audio signal AD therefrom, respectively. The video output section 21 and the audio output section 20 then sends the main image signal and the audio signal, respectively. At the same time, the video output section 34 sends a preview video signal.

Figure 6:
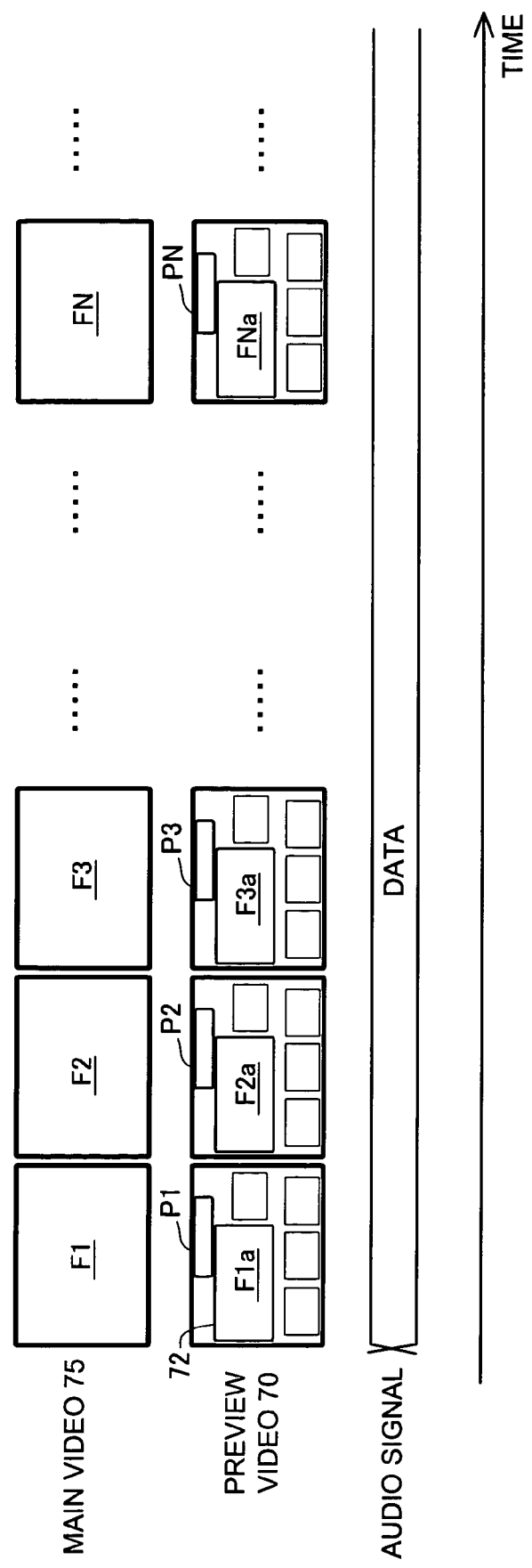
FIG. 6 is a diagram illustrating the main video and the preview video along a temporal axis on a frame basis.

FIG. 6 is a diagram illustrating the main video 75 and the preview video 70 of FIGS. 4 and 5 along a temporal axis on a frame basis. The main video 75 is played back by sequentially displaying image frames F1, F2, . . . , FN (where N is a positive integer) along the temporal axis, and in such a manner as to synchronize with the playback speed of the main video 75, audio signals are played back. The preview video 70 is played back by sequentially displaying image frames P1, P2, . . . , PN (where N is a positive integer) along the temporal axis. Here, the image frames P1, P2, . . . , PN include, respectively, image frames F1a, F2a, . . . , FNa obtained by converting the resolution of the image frames F1, F2, . . . , FN of the main video 75. In the present example, for convenience of description, the video signal is displayed in a sequential manner on a frame basis (progressive display). Instead of the progressive display, an interlaced display may be an option where the output video is displayed alternately between an even field containing even-numbered lines of the field and an odd field containing odd-numbered lines of the field.

When the user presses the playback button 45 during such a playback operation, the control section 22 detects the press of the playback button 45, and temporarily suspends the operation of the system. In detail, the playback control section 26B temporarily stops driving the optical disk 10, and repeatedly outputs an image frame from the buffer memory 27 at the time when the playback button 45 is pressed to fix the playback video. In this manner, the display device keeps displaying the same image frame. If the user presses the playback button 45 again during when the system is temporarily suspended, the control section 22 detects the press, and puts the system back to the playback operation. Responding to the user's action by pressing the eject button (not shown), the control section 22 ends the playback operation, and makes the loading mechanism 25 eject the optical disk 10.

The user may slide a slider (speed adjustment knob) 53 upward or downward to change the playback speed of video and audio. With sliding as such, the playback control section 26B detects the position of the slider 53, and changes the speed in accordance with the position. The lower the slider 53 slides, the faster the playback speed becomes, and the upper the slider 53 slides, the slower the playback speed becomes.

If the user presses a search button 42B or 42A, the playback control section 26B detects the press, and responsively makes the playback position of video and audio skip in the forward or backward direction on a file basis. More in detail, when the search button 42B locating on the right is pressed once, the playback position is skipped in the forward direction to the head of the next file. When the search button 42A on the left is pressed once, the playback position is skipped in the backward direction to the head of the current or previous file. By the user's action by pressing a fast-forward button 43B or a fast-backward button 43A, the playback control section 26B detects the press, and responsively plays back video and audio in the forward or reverse direction faster in speed than usual to fast-forward or fast-backward the video and audio for playback.

Described next is playback effects referred to as "braking", "spinning", and "scratching". The playback control section 26B has a speed control capability of controlling, in real time, the playback speed of video and audio to be played back from the main image signal ID and the audio signal AD coming from the buffer memory 27. The "braking", "spinning", and "scratching" are the playback effects to be produced by such a speed control capability. Specifically, the "braking" is an effect observed when the playback speed of video and audio is abruptly reduced. To derive such an effect, the user may press the playback button 45. In response, the playback control section 26B abruptly reduces the playback speed of video and audio at a predetermined change rate for temporary system suspension. Thereafter, by the user's action by pressing the playback button 45 again, the playback control section 26B greatly increases the playback speed of video and audio up to the normal speed at a predetermined change rate. Herein, a suspension adjustment knob 58A is input means for adjusting the change rate when the playback speed of video and audio is reduced, and a start adjustment knob 58B is input means for adjusting the change rate when the playback speed is increased. Through operation of the suspension adjustment knob 58A and the start adjustment knob 58B, the user can change the playback speed at any desired change rate to derive his or her desired video and audio effects.

The "spinning" is an effect observed when the playback speed of video and audio is suddenly changed differently from a normal speed. To produce such an effect, the user may press a top 55t of the jog dial 55 or the playback button 45 for temporary system suspension before spinning the jog dial 55. The playback control section 26B then detects the rotation speed and direction of the jog dial 55, and even if the user releases the jog dial 55, plays back the video and audio with the speed corresponding to the detected rotation speed and direction. When the jog dial 55 is rotated clockwise, the video and audio are played back in the forward direction, and when the jog dial 55 is rotated counterclockwise, the video and audio are played back in the reverse direction.

The "scratching" is an effect observed when the playback speed of video and audio is forcibly changed. To produce such an effect, the user may rotate the jog dial 55 with the top 55t thereof pressed. In response, the playback control section 26B temporarily stops playing back the video and audio, and then starts playback of the video and audio with the playback speed corresponding to the rotation angle (rotation amount) and direction of the jog dial 55. When the jog dial 55 is rotated clockwise, the video and audio are played back in the forward direction, and when the jog dial 55 is rotated counterclockwise, the video and audio are played back in the reverse direction. Through operation of the jog dial 55 as such, the user changes the playback speed in real time so that his or her desired original video and audio effects can be produced.

Cue Point Setting Operation

Figure 7:
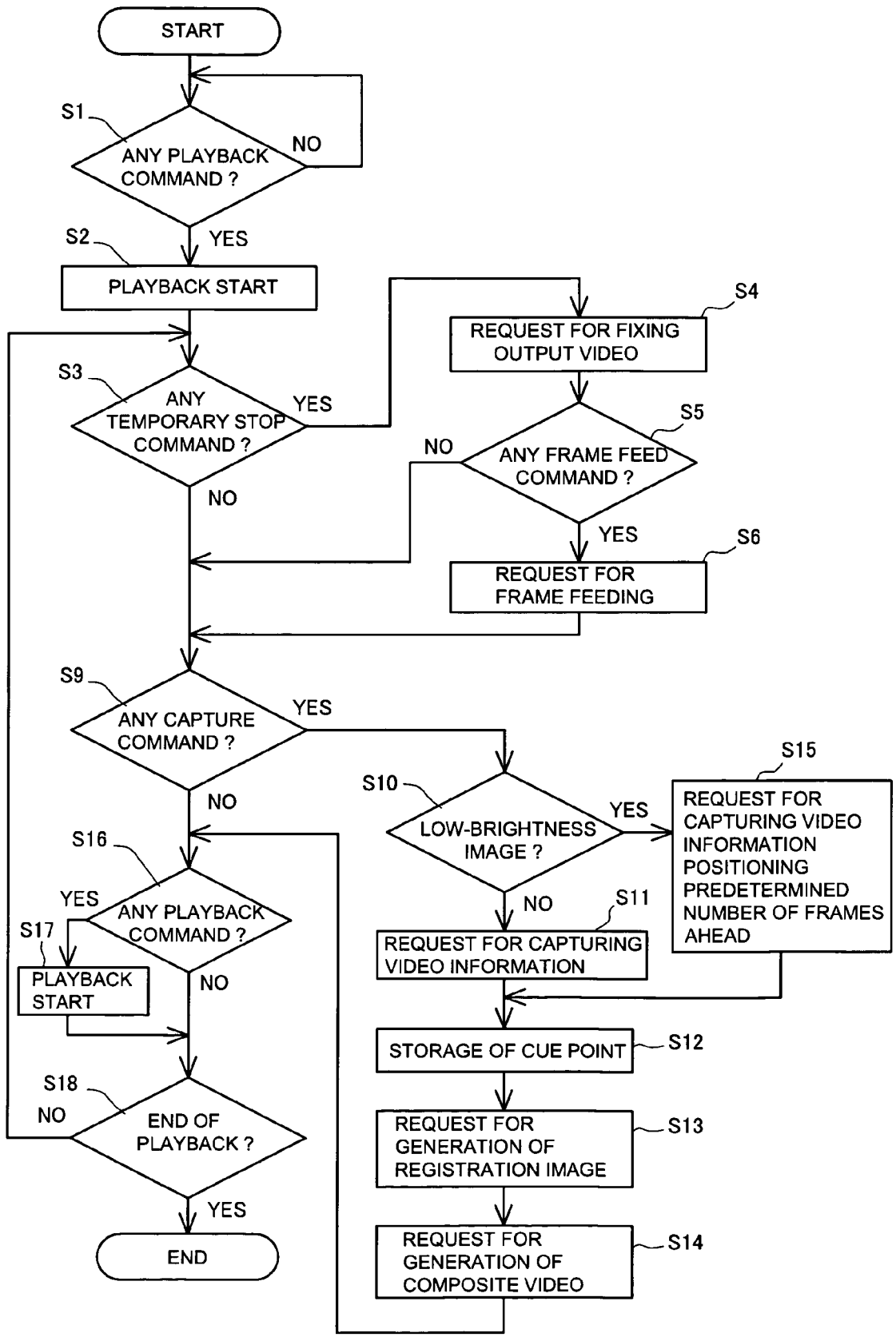
FIG. 7 is a schematic flowchart illustrating a procedure of a cue point setting process.
Figure 8:
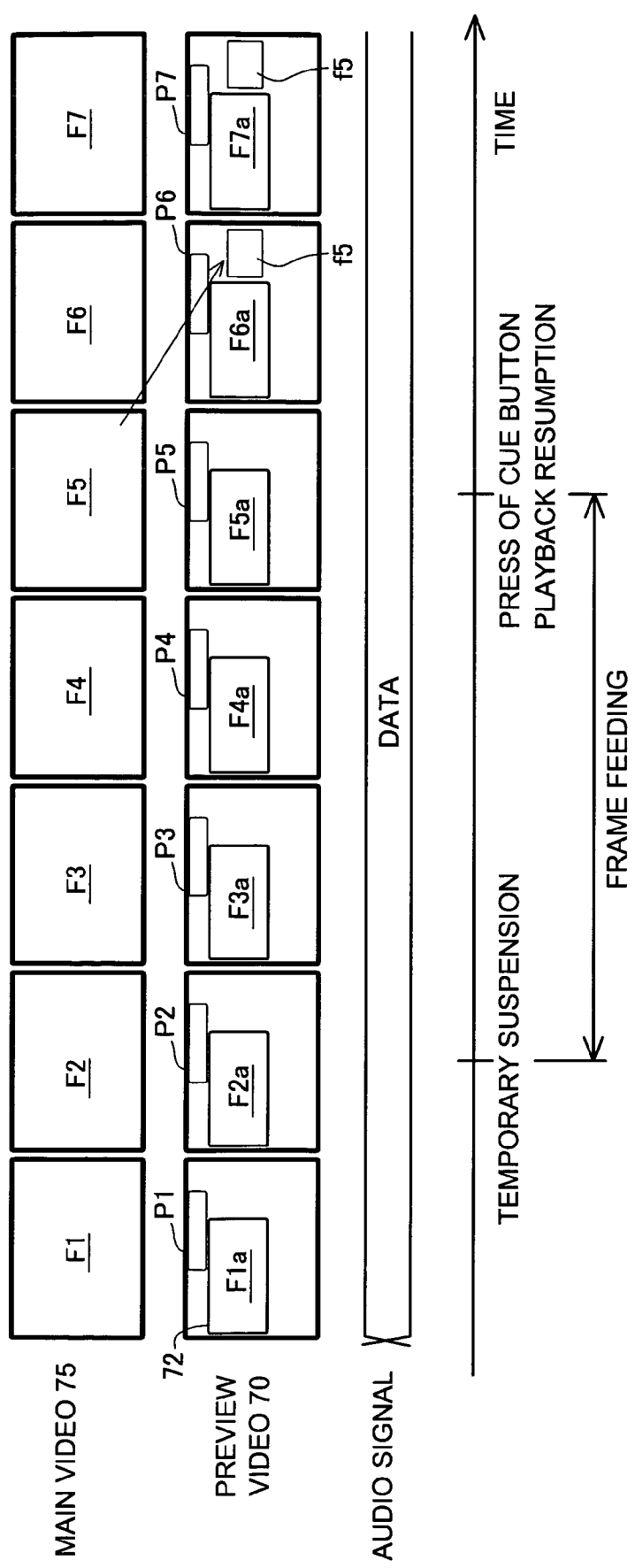
FIG. 8 is a schematic diagram illustrating exemplary video as a result of the cue point setting process.
Figure 9:
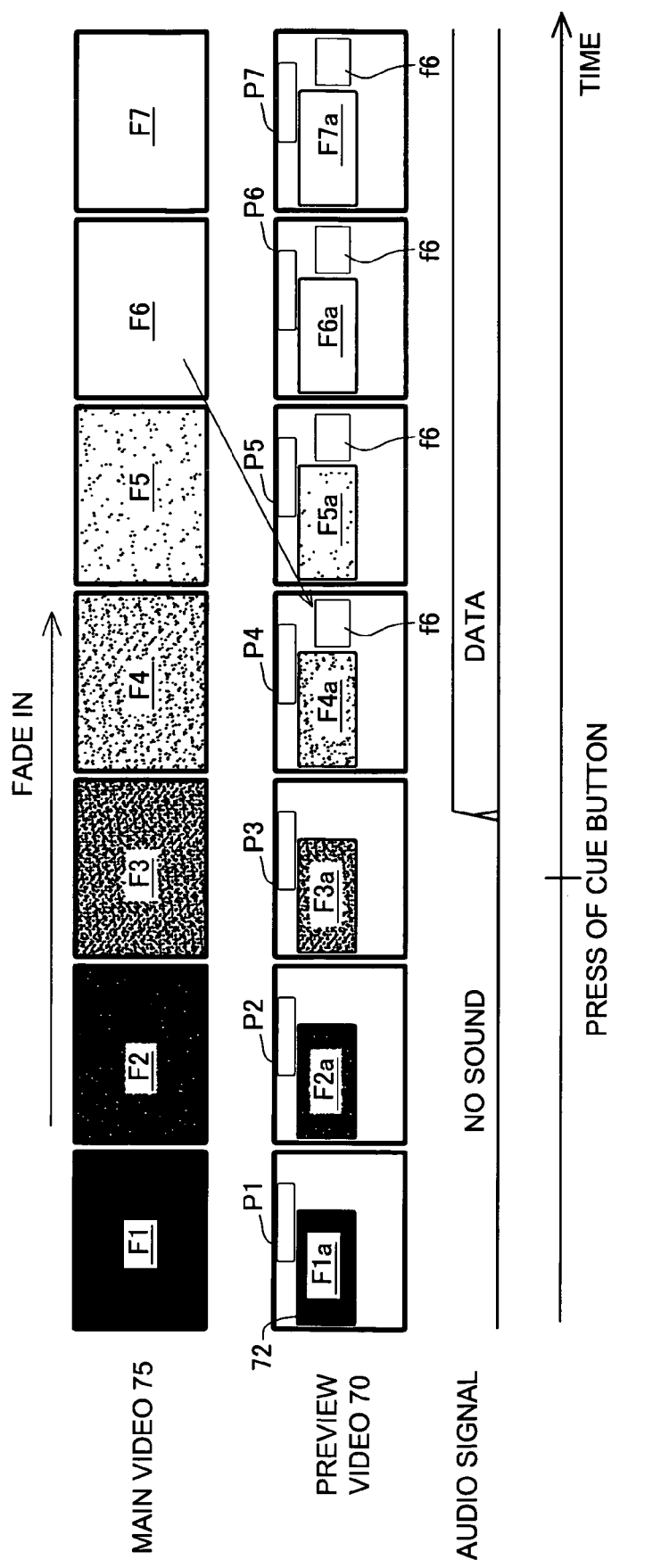
FIG. 9 is a schematic diagram illustrating another exemplary video as a result of the cue point setting process.

Described next is a cue point setting operation with reference to FIGS. 7 to 10. FIG. 7 is a schematic flowchart illustrating the procedure of the cue point setting process to be executed for cue point (registration point) setting, and FIGS. 8 and 9 are both a schematic diagram illustrating exemplary videos as a result of the cue point setting process.

Referring to FIG. 7, first in step S1, the control section 22 makes a determination whether a playback command is coming from the operation section 23. The control section 22 is in the standby state until a playback command comes from the operation section 23. Responding to the user's action by pressing the playback button 45, the operation section 23 issues a playback command. The control section 22 detects the command, thereby determining that the playback command is coming. Playback is thus started for video and audio through driving of the optical disk 10 (step S2). As a result, as shown in FIG. 8, the image frames F1, F2, . . . are sequentially displayed on the display device, and in synchronization with the resulting playback video, the audio is played back.

In the next step S3, the control section 22 makes a determination whether a temporary stop command is coming from the operation section 23. When the control section 22 determines that no temporary stop command is coming, the procedure goes to the next step S9. Responding to the user's action by pressing the playback button 45, the operation section 23 issues a temporary stop command. The control section 22 detects the command, thereby determining that the temporary stop command is coming. The playback control section 26B repeatedly outputs a main image signal ID of the same frame from the video memory 19 (step S4). If the temporary stop command is issued when the image frame F2 of FIG. 8 is displayed, the main video 75 is fixed to the image frame F2.

After step S4 is through, in the next step S5, the control section 22 makes a determination whether a frame feed command is coming from the operation section 23. If the control section determines that no frame feed command is coming, the procedure goes to step S9. Responding to the user's action by rotating the jog dial 55, the operation section 23 issues, toward the control section 22, a frame feed command corresponding to the rotation angle and direction of the jog dial 55. The control section 22 detects the command, and the playback control section 26B accordingly controls the playback speed of the main video 75 based on the rotation angle and direction of the jog dial 55 (step S6). To be specific, the playback control section 26B addresses the image frame corresponding to the rotation angle of the jog dial 55 for output from the video memory 19. At this time, when the jog dial 55 is rotated-clockwise, the playback control section 26B performs image frame addressing in the forward direction, and when the jog dial 55 is rotated counterclockwise, the playback control section 26B performs image frame addressing in the reverse direction. In the example of FIG. 8, the jog dial 55 is assumed as rotating clockwise, and the image frames F2, F3, F4, and F5 corresponding to the rotation angle thereof are sequentially displayed. Thereafter, the procedure goes to step S9.

In step S9,.the control section 22 determines whether a capture command is coming from the operation section 23. When the control section 22 determines that no capture command is coming, the procedure goes to step S16. Responding to the user's action by pressing a cue button 44 during when the system is temporarily suspended, or by pressing a real-time cue button 46 during the playback operation, the operation section 23 issues a capture command. The control section 22 detects the command, thereby determining that the capture command is coming. Thereafter, the procedure goes to step S10. In step S10, the control section 22 makes a determination whether the image data coming from the video memory 19 has a low-brightness image or not. This determination process will be described later.

When the image data is not determined to have a low-brightness image in step S10, the control section 22 requests the capture processing section 4 to capture the main image signal ID coming from the video memory 19 (step S11). In response, the frame memory 30 captures the main image signal ID from the video memory 19, produces an image frame from the captured main image signal ID, and stores the image frame. In the next step S12, the point setting section 26A stores, into a register (not shown), the playback position of the captured image data as a cue point (registration point). Referring to FIG. 8, at the time point when the image frame F5 is displayed, a capture command is issued, and the frame memory 30 stores the image frame F5.

After step S12 is through, in the next step S13, the point setting section 26A requests the capture processing section 4 to generate a registration image of a low resolution from the image frame stored in the video memory 19. The resulting registration image is referred to as cue image in the below. In response, the frame memory 30 outputs the image frame in its storage to the video capture section 31. The video capture section 31 performs resolution conversion of the image frame to generate a cue image for storage into the image memory 31a.

In the next step S14, the point setting section 26A requests the capture processing section 4 to generate a composite image signal SD by superimposing the cue image stored in the image memory 31a onto the main image signal ID coming from the video memory 19. In response, the video capture section 31 forwards the resulting cue image to the image superimposing section 32. The image superimposing section 32 superimposes the cue image with a specific format onto the main image signal ID coming from the video memory 19, and also goes through the OSD process to generate a composite image signal SD for output to the video output section 34. In this regard, the OSD process is executed to superimpose any text information including the file name and playback time of playback video on the signal. The video output section 34 subjects the composite image signal SD received from the image superimposing section 32 to an image tone process and others, and a preview video signal generated thereby is output. Referring to FIG. 8, the image superimposing section 32 superimposes a cue image f5 and the main video 75 on the signal so that image frames P6 to P9 are produced for the preview video 70. Here, the cue image f5 is produced by resolution conversion of the image frame F5.

After completion of the cue point setting, the procedure goes to step S16. In step S16, the control section 22 determines whether a playback command is coming from the operation section 23. Responding to the user's action by pressing the playback button 45, the control section 22 detects the press of the playback button 45. Thereafter, the control section 22 makes the buffer memory 27 output the main image signal ID and the audio signal AD to resume playback of video and audio (step S17). When no temporary stop command comes in step S3, the control section 22 determines in step S16 that there is no playback command because the playback operation is continued for video and audio. Thereafter, the procedure goes to step S18.

In the next step S18, the control section 22 determines whether or not to end the playback operation. If the control section 22 determines not to end the playback operation, the procedure repeats step S3 and onward. On the other hand, responding to the user's action by pressing an end button (not shown) or others, the control section 22 determines to end the playback operation so that the procedure ends.

In step S10, the control section 22 detects whether the head portion of the playback file is fading in brightness, thereby determining whether the image data has a low-brightness image. FIG. 9 schematically illustrates exemplary video and audio in the case where a capture command is issued with respect to such a fade-in portion. When the image data is determined in step S10 to have the low-brightness image, the control section 22 requests the capture processing section 4 to capture from the video memory 19 the main image signal ID positioning a predetermined number of frames ahead (step S15). In response, the frame memory 30 captures the corresponding main image signal ID from the video memory 19, produces an image frame from the captured main image signal ID, and stores the image frame. In the next step S12, the point setting section 26A stores in the register the playback position of the main image signal ID as a cue point. Thereafter, the control section 22 issues a request for generation of a cue image (step S13), and then another request for generation of a composite image (step S14).

Referring to FIG. 9, a capture command has been issued with respect to the image frame F6 of the main video 75. The frame memory 30 has captured the main image signal ID positioning three frames ahead, and stores the image frame F6. The image superimposing section 32 superimposes the main image 75 and the cue image f6 obtained from the image frame F6 on the signal. The video output section 34 processes the resulting composite image signal SD to generate the preview video 70 for output.

According to the cue point setting process described above, user can take a look at the preview video 70 to see the display contents of the main video and the cue video in a single screen. Accordingly, any desired playback position can be stored as a cue point with a simple operation in a swift manner. From the preview video 70, user can check the cue point for video and audio with a single glance. With the conventional system of exercising real-time control only over the tempo of playback audio, to check the registration point, user has to listen to the playback audio around the cue point. On the other hand, in the present example, the cue point associated with the cue image with a thumbnail-size image can be recorded. This thus allows the user to easily establish an association between the cue point and the audio.

When the image data requested to be captured has a low-brightness image, the main image signal ID positioning a predetermined number of frames ahead is accordingly captured. Then, from the captured main image signal ID, a cue image is generated to be displayed together with the preview video 70. This thus avoids recording of any dark image with little information as a cue image. As shown in FIG. 9, the fade-in portion is often an acoustic portion. In this case, by capturing the main image signal ID positioning a predetermined number of frames ahead as in the present example, it becomes possible to avoid recording a cue image corresponding to an an acoustic audio signal.

Hot Cue Point Setting Operation

Figure 10:
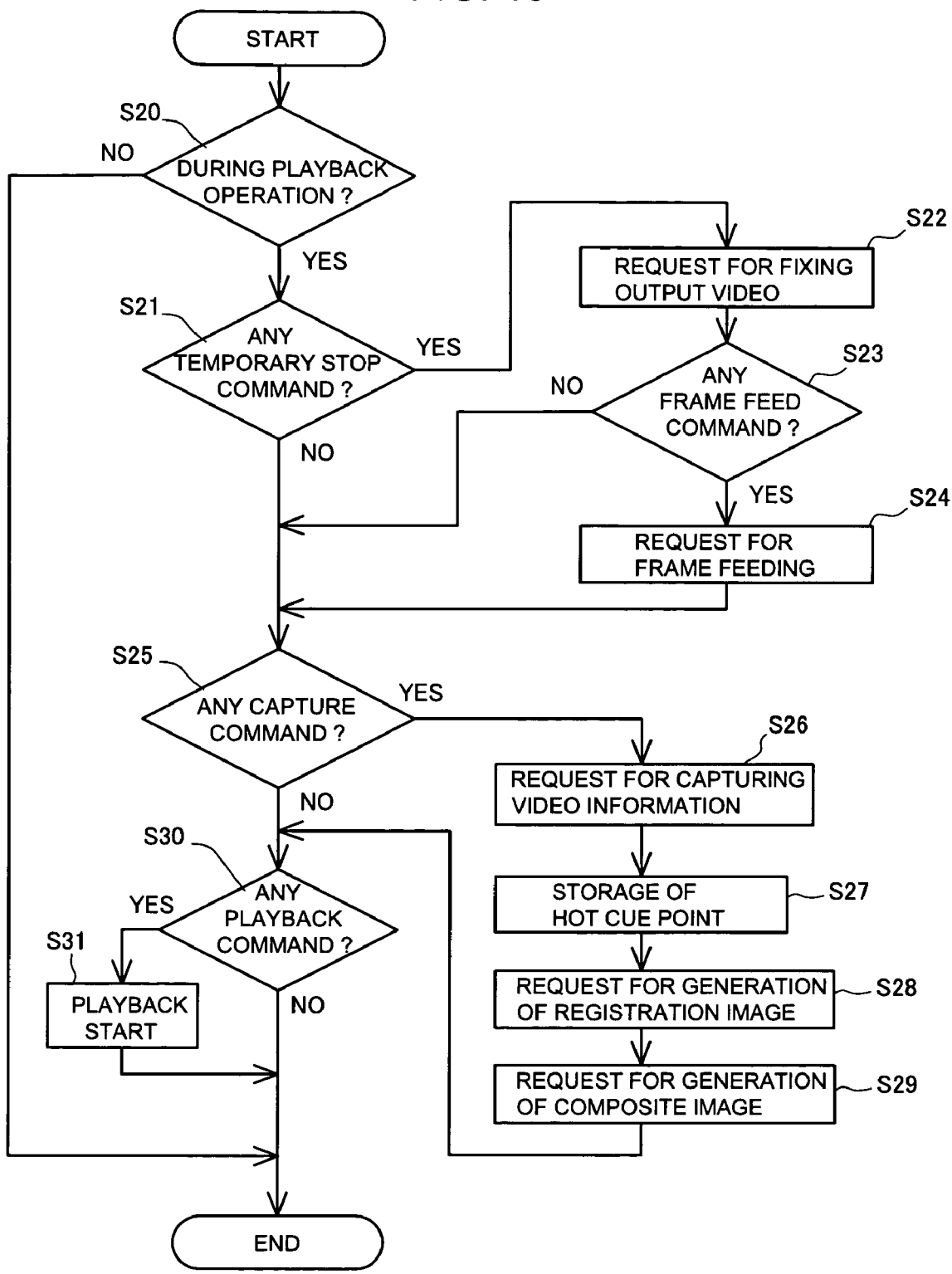
FIG. 10 is a schematic flowchart illustrating a procedure of a hot cue point setting process.
Figure 11:
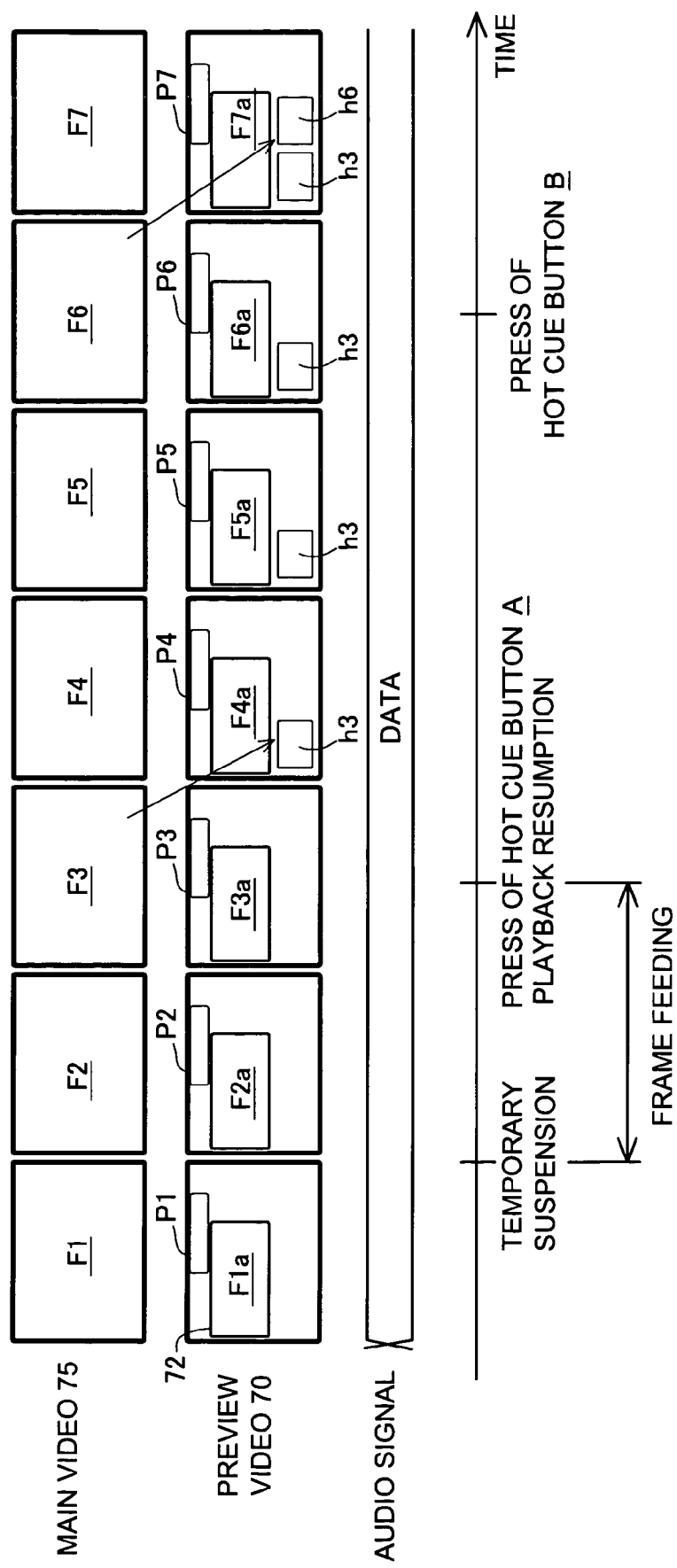
FIG. 11 is a schematic diagram illustrating exemplary video as a result of the hot cue point setting process.

Described next is a hot cue point setting operation with reference to FIGS. 10 and 11. FIG. 10 is a schematic flowchart illustrating a procedure of a hot cue point setting process to be executed for hot cue point (registration point) setting. FIG. 11 is a schematic diagram illustrating exemplary video as a result of the hot cue point setting process.

When detecting the press of a storage/playback button 40D, the control section 22 causes hot cue buttons 40A, 40B, and 40C to flash red and starts the hot cue setting process of FIG. 10. Referring to FIG. 10, in step S20, the control section 22 first makes a determination whether the optical disk 10 is currently played back. If the control section 22 determines that the optical disk 10 is not played back, the procedure of the hot cue point setting process ends. On the other hand, when the optical disk 10 is determined as being played back, the control section 22 makes another determination whether a temporary stop command is coming from the operation section 23. When the determination is made that no temporary stop command is coming, the procedure goes to the next step S25. Responding to the user's action by pressing the playback button 45, the operation section 23 issues a temporary stop command. At this time, the control section 22 determines that a temporary stop command is coming, and the playback control section 26B accordingly causes the video memory 19 to repeatedly output a main image signal ID of the same frame (step S22).

Then, the control section 22 determines whether a frame feed command is coming from the operation section 23 (step S23). When the control section 22 determines that no frame feed command is coming, the procedure goes to step S25. When the user rotates the jog dial 55, the operation section 23 issues to the control section 22 a frame feed command corresponding to the rotation angle and direction of the jog dial 55. At this time, the control section 22 determines that a frame feed command is coming, and the playback control section 26B controls the playback speed of the main video 75 based on the rotation angle and direction of the jog dial 55 (step S24). That is, the playback control section 26B addresses the image frame corresponding to the rotation angle of the jog dial 55 for output from the video memory 19. At this time, when the jog dial 55 is rotated clockwise, the playback control section 26B performs image frame addressing in the forward direction, and when the jog dial 55 is rotated counterclockwise, image frame addressing is performed in the reverse direction. In FIG. 11, responding to the jog dial 55 rotating clockwise, the image frames F2 and F3 are sequentially displayed correspondingly to the rotation angle of the jog dial 55.

In the next step S25, the control section 22 determines whether a capture command is coming from the operation section 23. When the determination is made that no capture command is coming, the procedure goes to step S30. When the user presses any one of the red-flashing hot cue buttons 40A, 40B, and 40C, the control section 22 determines that a capture command is coming. Thus, the control section 22 requests the capture processing section 4 to capture the main image signal ID coming from the video memory 19 (step S26). In response, the frame memory 30 captures the main image signal ID from the video memory 19, produces an image frame from the captured main image signal ID, and stores the image frame. Herein, the control section 22 causes the pressed hot cue button to flash green.

In the next step S27, the point setting section 26A stores, into the register (not shown), the playback position of the captured main image signal ID as a hot cue point (registration point). In the example of FIG. 11, at the time point when the image frame F3 is displayed, the hot cue button 40A is pressed, and the frame memory 30 stores the image frame F3.

In the next step S28, the point setting section 26A requests the capture processing section 4 to generate a registration image of a low resolution from the image frame stored in the video memory 19. The resulting registration image is hereinafter referred to as a hot cue image. In this manner, the frame memory 30 outputs the image frame in its storage to the video capture section 31. The video capture section 31 performs resolution conversion of the image frame to generate a hot cue image for storage into the image memory 31a.

In the next step S29, the point setting section 26A also requests the capture processing section 4 to generate a composite image by superimposing the hot cue image stored in the image memory 31a onto the main image signal ID coming from the video memory 19. In response, the video capture section 31 forwards the resulting hot cue image to the image superimposing section 32. The image superimposing section 32 superimposes the hot cue image with a specific format onto the main image signal ID coming from the video memory 19, and also goes through the OSD process to generate a composite image signal SD for output to the video output section 34. Thereafter, the procedure goes to step S30.

In step S30, the control section 22 determines whether a playback command is coming from the operation section 23. Responding to the user's action by pressing the playback button 45, the control section 22 detects the press of the playback button 45. The control section 22 accordingly causes the buffer memory 27 to output the main image signal ID and the audio signal AD to resume playback of video and audio (step S31). When no temporary stop command comes in step S21, the control section 22 determines in step S30 that no playback command is coming because the playback operation is continued for video and audio. This is the end of the host cue point setting process.

Referring to FIG. 11, the image superimposing section 32 generates the image frames P4 to P9 of the preview video 70 by superimposing a hot cue image h3 and the image frames F4 to F9 of the main video 75 on the signal. In this regard, the hot cue image h3 is produced by converting the resolution of the image frame F3. Moreover, at the time point when the image frame F6 is displayed, user presses the storage/playback button 40D and the hot cue button 40B in turn, whereby the hot cue image h6 of the image frame F6 is displayed in thumbnail size in the preview video 70.

According to the hot cue point setting process described above, user can take a look at the preview video 70 to see the display contents of the main video and the cue image in a single screen. Accordingly, any desired playback position can be stored as a cue point with a simple operation in a swift manner. Additionally, from the preview video 70, the user can check the cue point for video and audio with a single glance. In the present example, the hot cue point associated with the hot cue image with a thumbnail-size image is recorded. This thus allows the user to easily establish an association between the hot cue point and the audio.

Cue Point Playback Operation

Figure 12:
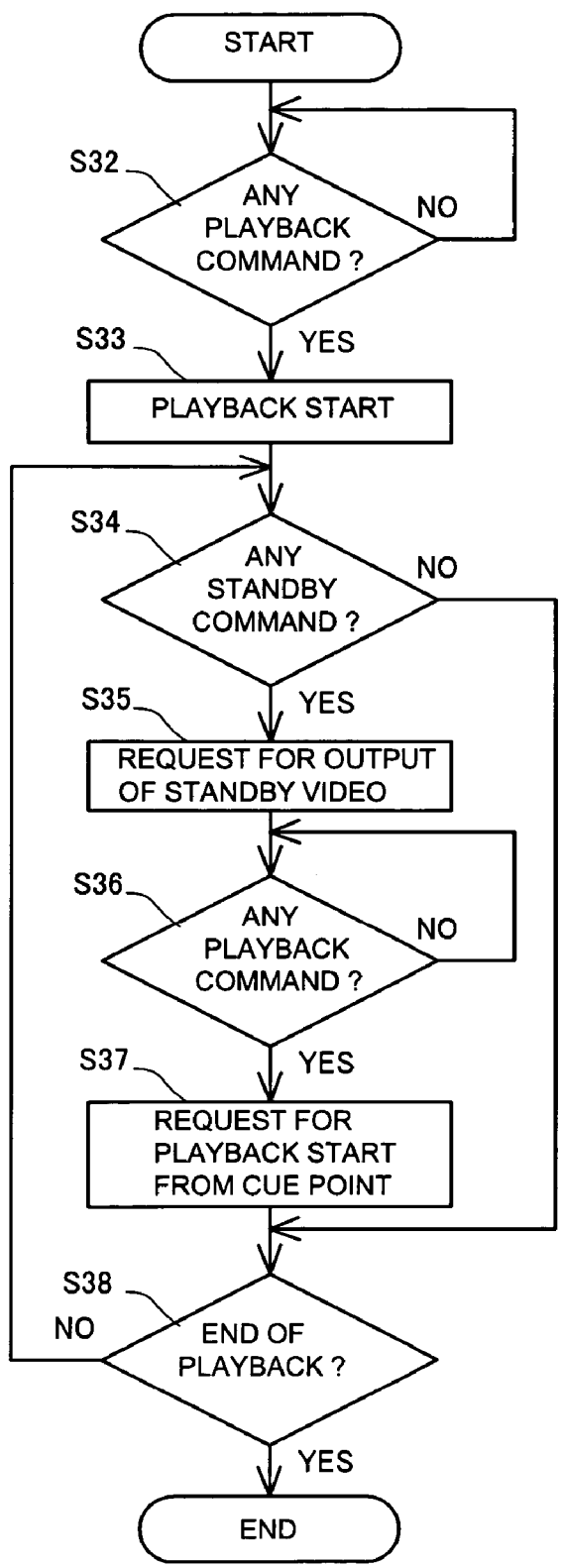
FIG. 12 is a schematic flowchart illustrating a procedure of a cue point playback process.
Figure 13:
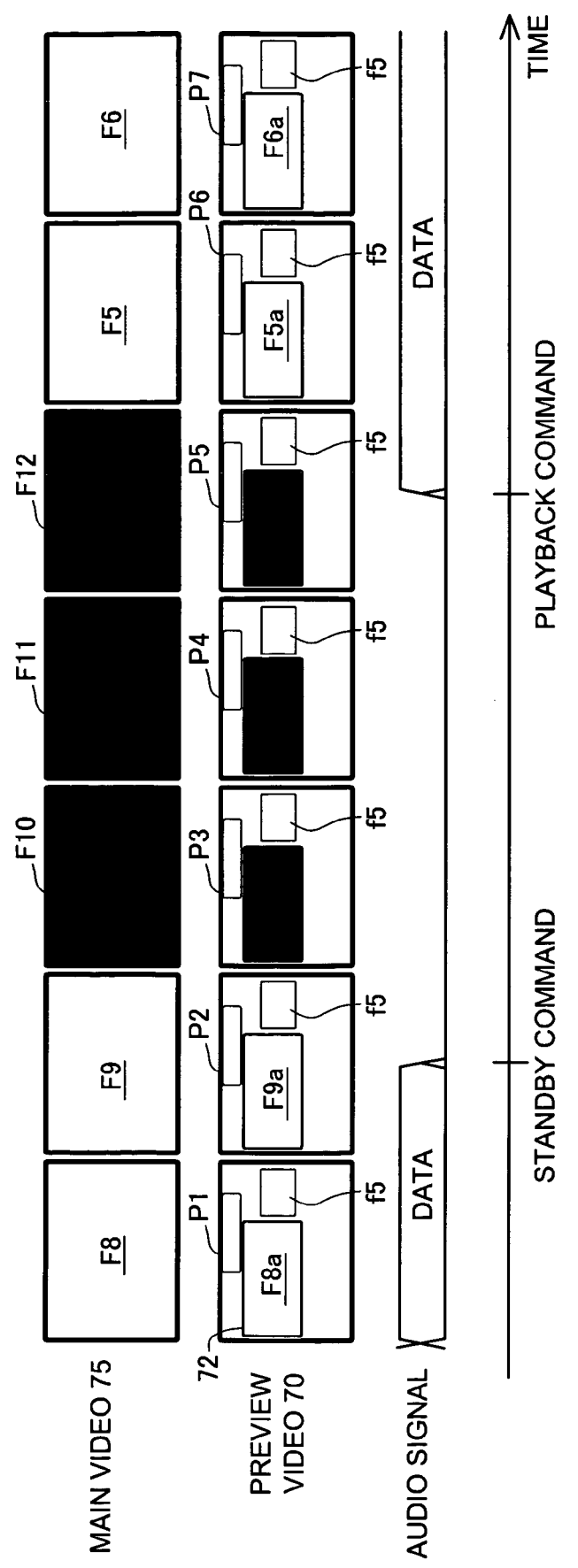
FIG. 13 is a schematic diagram illustrating exemplary video as a result of the cue point playback process.

Referring to FIGS. 12 and 13, described next is the playback operation utilizing the cue point. FIG. 12 is a schematic flowchart illustrating a cue point playback process. FIG. 13 is a schematic diagram illustrating exemplary video as a result of the cue point playback process.

Referring to FIG. 12, in step S32, the control section 22 makes a determination whether a playback command is coming from the operation section 23. The control section 22 is in the standby state until a playback command comes from the operation section 23. Responding to the user's action by pressing the playback button 45, the operation section 23 issues a playback command. The control section 22 determines that the playback command is coming through detection thereof, and accordingly starts playback of video and audio (step S33).

In the next step S34, the control section 22 makes a determination whether a standby command (back cue command) is coming. When the control section 22 determines that no standby command is coming, the procedure goes to the next step S38. Responding to the user's action by pressing the cue button 44, the control section 22 detects the press, and thus determines that a standby command is coming. Then, the playback control section 26B causes the buffer memory 27 to stop outputting the main image signal ID and the audio signal AD, and to output standby video in black to the video output section 21 (step S35). Referring to FIG. 13, a standby command is issued responding to the display of the image frame F9, and the display colors of the following image frames F10, F11, and F12 change to black.

In the next step S36, a determination is made whether a playback start command is coming. The control section 22 is in the standby state until a playback start command comes from the operation section 23. Responding to the user's action by pressing the playback button 45, the control section 22 determines that a playback start command is coming through detection thereof. The playback control section 26B accordingly outputs from the buffer memory 27 the audio signal AD and the main image signal ID including image frames following the cue point (step S37). Referring to FIG. 13, at the time point when the image frame F12 is displayed, a playback start command is issued. Thereafter, based on the image frame F5 at the cue point (registration point) corresponding to the cue image f5, the main video 75 is played back.

In step S38, the control section 22 then determines whether or not to end the playback operation. When the control section 22 determines not to end the playback operation, the procedure repeats step S34 and onward. Responding to the user's action by pressing the end button (not shown) or others, the control section 22 determines to end the playback operation so that the procedure is ended.

According to the cue point playback process described above, user can easily operate the playback process of video and audio in a swift manner by putting the playback position back to the cue point with any desired timing while viewing the preview video. Moreover, in a time period from a standby command to a playback start command, the main video 75 is the standby video in black. At an instant when the playback start command is issued, video and audio playback is resumed from a cue point used as a starting point. Thus, its impact becomes high on viewers who view the main video 75. While the video output section 21 outputs the standby video in black in step S35, the display color of the standby video may be a color other than black, for example, blue or red.

Hot Cue Point Playback Operation

Figure 14:
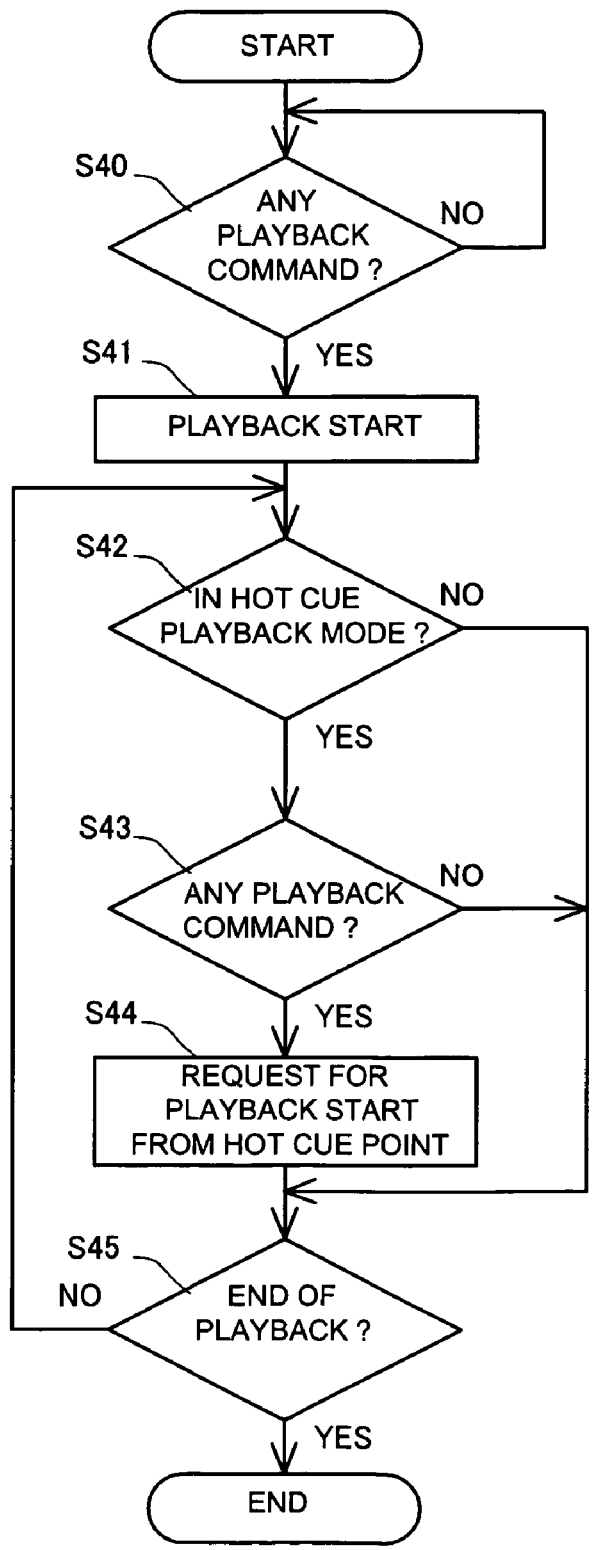
FIG. 14 is a schematic flowchart illustrating a hot cue point playback process.
Figure 15:
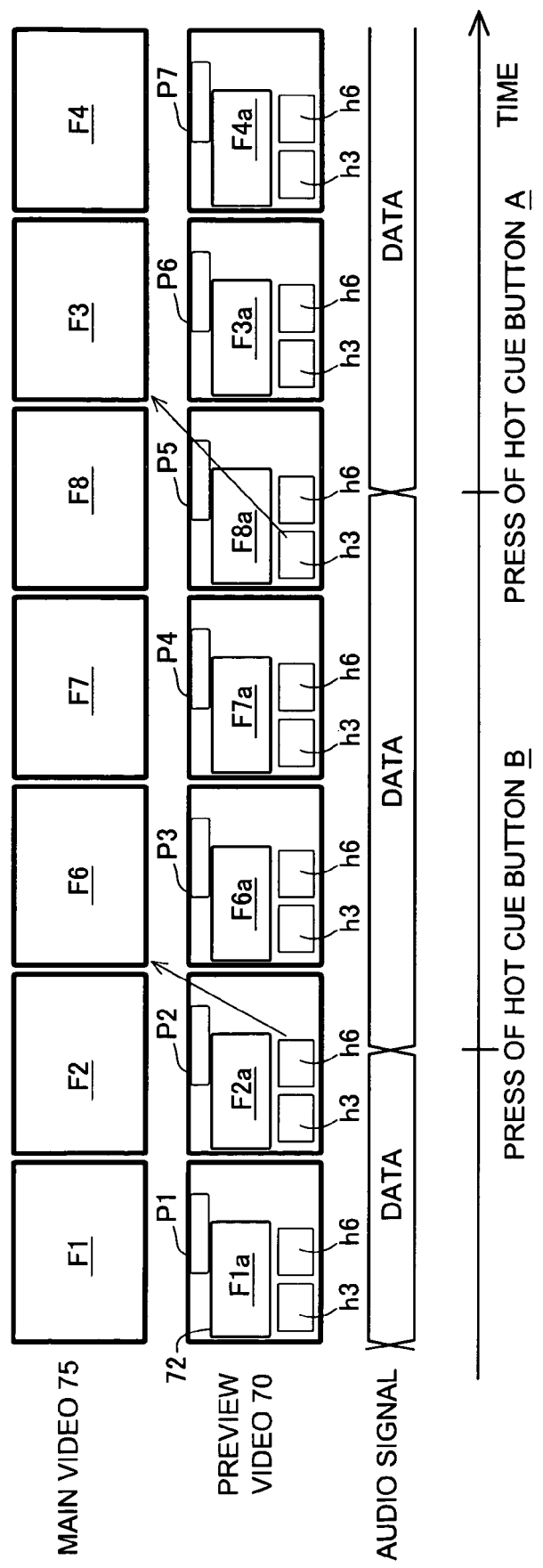
FIG. 15 is a schematic diagram illustrating exemplary video as a result of the hot cue point playback process.

Referring to FIGS. 14 and 15, described next is the playback operation using the hot cue point. FIG. 14 is a schematic flowchart illustrating the hot cue point playback process, and FIG. 15 is a schematic diagram illustrating exemplary video as a result of the hot cue point process.

Referring to FIG. 14, in step S40, the control section 22 makes a determination whether a playback command is coming from the operation section 23. The control section 22 is in the standby state until a playback command comes from the operation section 23. Responding to the user's action by pressing the playback button 45, the operation section 23 issues a playback command. The control section 22 determines that a playback command is coming through detection thereof, and accordingly starts video and audio playback.

In the next step S42, the control section 22 determines whether the system is in a hot cue playback mode. Once the storage/playback button 40D is pressed, the control section 22 detects the press, and thus determines that the system is in a hot cue playback mode. Then, the procedure goes to step S43. On the other hand, when the control section 22 determines that the system is not in the hot cue playback mode, the procedure goes to step S45.

In step S43, a determination is made whether a playback command is coming. To be specific, when the user presses any one of the hot cue buttons 40A, 40B, and 40C, the control section 22 detects the press, and thus determines that a playback command is coming. In this case, the playback control section 26B moves, in real time, the playback position to the hot cue point corresponding to the pressed button of hot cue buttons 40A, 40B, and 40C (step S44). As a result, the playback position of the main video 75 and audio suddenly moves to the hot cue point. On the other hand, when the determination is made that no playback command is coming in step S43, the procedure goes to step S45. Referring to FIG. 15, the preview video 70 displays the hot cue image h3 obtained from the image frame F3, and the hot cue image h6 obtained from the image frame F6. The hot cue image h3 is assigned to the hot cue button 40A of FIG. 2, and the hot cue image h6 is assigned to the hot cue button 40B. When the main video 75 displays the image frame F2, the user presses the hot cue button 40B, and the main video 75 responsively changes to the video of the image frame F6 and onward.

In step S45, the control section 22 determines whether or not to end the playback operation. When the control section 22 determines not to end the playback operation, the procedure repeats step S42 and onward. Referring to FIG. 15, at the time point when the main video 75 displays the image frame F8, the user presses the hot cue button 40A, and the main video 75 responsively changes to the video of the image frame F3 and onward. On the other hand, when the user presses the end button (not shown) or others, the control section 22 determines to end the playback operation, and thus the procedure ends the processes.

According to the hot cue point playback process described above, user can easily operates the playback process of video and audio in a swift manner by putting the playback position back to the hot cue point with any desired timing while viewing the preview video.

Registration Point Copying Process

Figure 16:
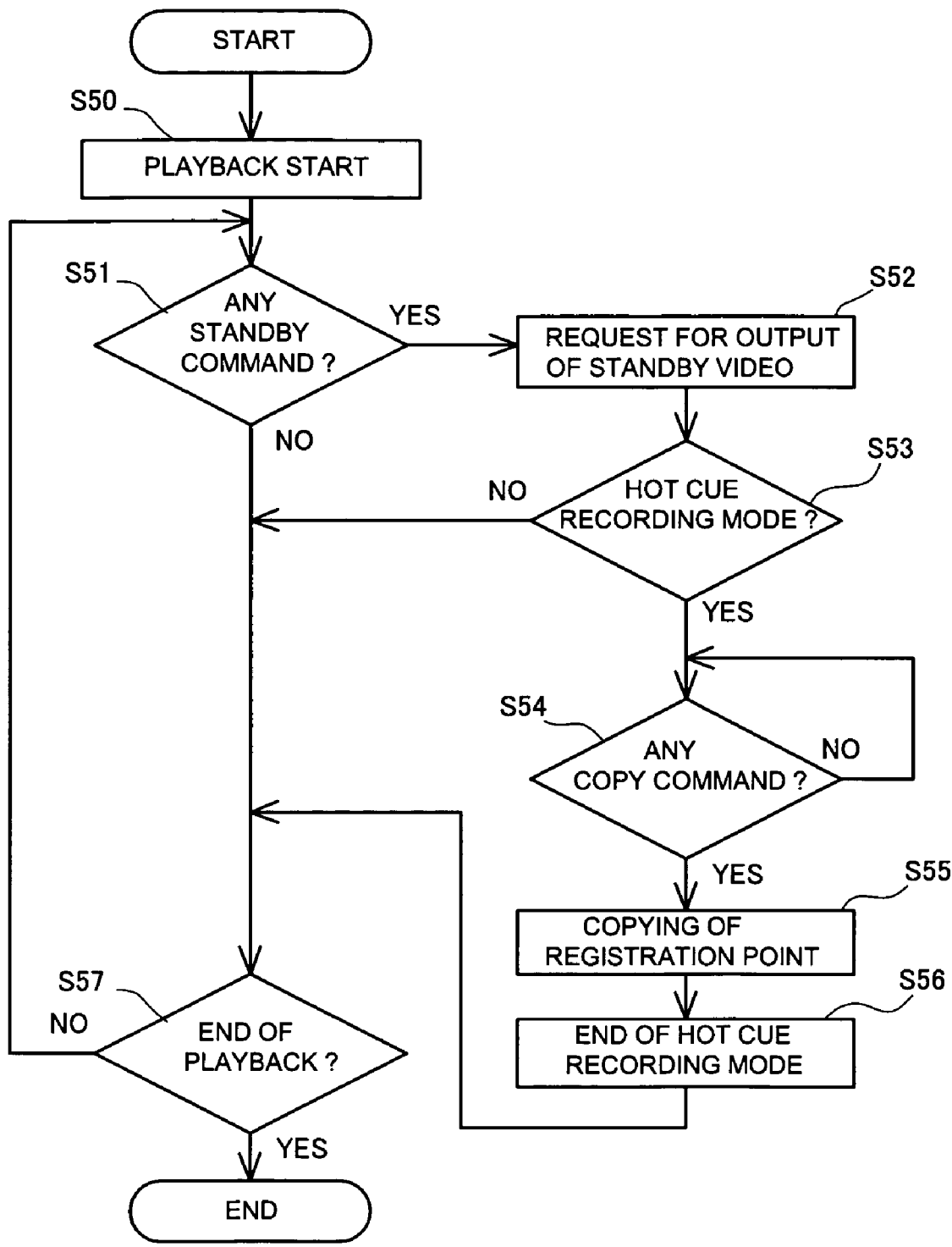
FIG. 16 is a schematic flowchart illustrating a registration point copying process.

Referring to FIGS. 16 and 17, described next is a registration point copying operation of copying a cue point to a hot cue point. FIG. 16 is a schematic flowchart illustrating a registration point copying process, and FIG. 17 is a schematic diagram illustrating exemplary video as a result of the registration point copying process.

Referring to FIG. 16, in step S50, the operation section 23 issues a playback command, and the playback control section 26B requests for starting of video and audio playback. In the next step S51, the control section 22 makes a determination whether a standby command (back cue command) is coming. When the control section 22 determines that no standby command is coming, the procedure goes to the next step S57. Responding to the user's action by pressing the cue button 44, the control section 22 detects the press, and thus determines that a standby command is coming. Then, the playback control section 26B causes the buffer memory 27 to stop outputting the main image signal ID and the audio signal AD, and to output standby video in black to the video output section 21 (step S52). Referring to FIG. 17, the main video 75 is the standby video in black after the standby command is issued.

In step S53, the point setting section 26A determines whether the system is in a hot cue recording mode. Once the storage/playback button 40D is pressed, the point setting section 26A detects the press, and thus determines that the system is in the hot cue recording mode. Then, the procedure goes to step S54. On the other hand, when the point setting section 26A determines that the system is not in the hot cue recording mode, the procedure goes to step S57.

In step S54, the point setting section 26A determines whether a copy command is coming. The control section 22 is in the standby state until a copy command comes from the operation section 23. Responding to the user's action by pressing any one of the hot cue buttons 40A, 40B, and 40C, the point setting section 26A determines that a copy command is coming, and accordingly copies the cue point to the hot cue point (step S55). The playback control section 26B then displays the cue image on the preview video 70 as the hot cue image. Thereafter, the hot cue recording mode is cancelled (step S56). Referring to FIG. 17, at the time point when the image frame P3 is displayed, the user presses the hot cue button 40A, and thereafter, the cue image f5 is copied into the hot cue image h5, and displayed on the display window 74.

Then in step S57, the control section 22 determines whether or not to end the playback operation. When the control section 22 determines not to end the playback operation, the procedure repeats step S51 and onward. On the other hand, responding to the user's action by pressing the end button (not shown) or others, the control section 22 determines to end the playback operation, and the procedure is ended.

In the foregoing, the structure and the operation of the optical disk playback system 1 are described. In the above example, used as the registration image is a still image that is produced by converting the resolution of the image frame. Alternatively, a motion image may be used, and the system structure may be accordingly changed for display of the motion image on the cue display window 73 or the hot cue display window 74.

It is understood that the foregoing description and accompanying drawings set forth the preferred embodiment of the invention at the present time. Various modifications, additions, and alternatives will, of course, become apparent to those skilled in the art in light of the foregoing teachings without departing from the spirit and scope of the disclosed invention. Thus, it should be appreciated that the invention is not limited to the disclosed embodiment but may be practiced within the full scope of the appended claims.

This application is based on a Japanese Patent Application No. 2003-336974 which is hereby incorporated by reference.

What is claimed is:

1. A signal processor for playing back an image signal including a plurality of image frames, comprising:
    a buffer memory for storing the image signal for output as a main image signal;
    a point setting section for storing a position on a temporal axis of the main image signal as a registration point in response to a given capture command, said registration point corresponding to the capture command;
    a playback control section for playing back the image signal by causing said buffer memory to output image frames following the registration point in response to a given playback command;
    a video capture section for generating a registration image based on at least one image frame in a neighborhood of the registration point of the main image signal outputted from said buffer memory, and storing the registration image; and
    an image superimposing section for superimposing the registration image onto the main image signal for display in a signal screen to generate a composite image signal,
    wherein said playback control section has a cue playback capability of temporarily stopping playback of the main image signal in response to a given standby command, and thereafter causing said buffer memory to output the image frame following the registration point in response to said playback command.

2. The signal processor according to claim 1, further comprising:
    a first video output section for providing the main image signal coming from said buffer memory to a display device; and
    a second video output section for providing the composite image signal to said display device.

3. The image processor according to claim 1, further comprising an audio output section for providing an audio signal to a playback device,
    wherein said buffer memory stores and outputs the audio signal together with the image signal, and said playback control section causes said buffer memory to output the audio signal to said audio output section in synchronization with the main image signal.

4. The image processor according to claim 1, wherein, when the main image signal has a low-brightness image frame, said point setting section stores a position a predetermined number of frames ahead of the low-brightness image frame on a temporal axis.

5. The signal processor according to claim 4, wherein the low-brightness image frame is included in a fade-in portion of the main image signal.

6. The signal processor according to claim 1, wherein said point setting section has a capability of storing a plurality of the registration points.

7. The signal processor according to claim 1, wherein said video capture section generates the registration image by converting the resolution of the image frame.

8. The signal processor according to claim 1, wherein said playback control section has a hot cue playback capability of moving, in real time, the position on the temporal axis of the main image signal outputted from said buffer memory, to the registration point designated by the playback command.

9. The signal processor according to claim 1, further comprising:
    a loading mechanism for loading an information recording medium in a detachable manner;
    a recording medium drive section for reading a playback signal from said information recording medium; and
    a signal processing section for generating the image signal by decoding the playback signal.

10. The signal processor according to claim 1, further comprising an operation section for providing the playback command and the capture command.

11. The signal processor according to claim 10, wherein said operation section includes a rotary control element, and
    said playback control section has a speed control capability of controlling, in real time, a playback speed of the main image signal based on a rotation angle and a rotation direction of said rotary control element.

12. The signal processor according to claim 11, wherein said playback control section causes said buffer memory to output the main image signal in either a forward direction or a reverse direction in accordance with the rotation direction of said rotary control element.

13. The signal processor according to claim 10, wherein said operation section includes a slider, and
    said playback control section has a speed control capability of controlling, in real time, a playback speed of the main image signal based on an operation position of said slider.

* * * * *